July 5, 1938.  L. DE FLOREZ  2,122,560
FLUID VALVE
Filed March 21, 1936
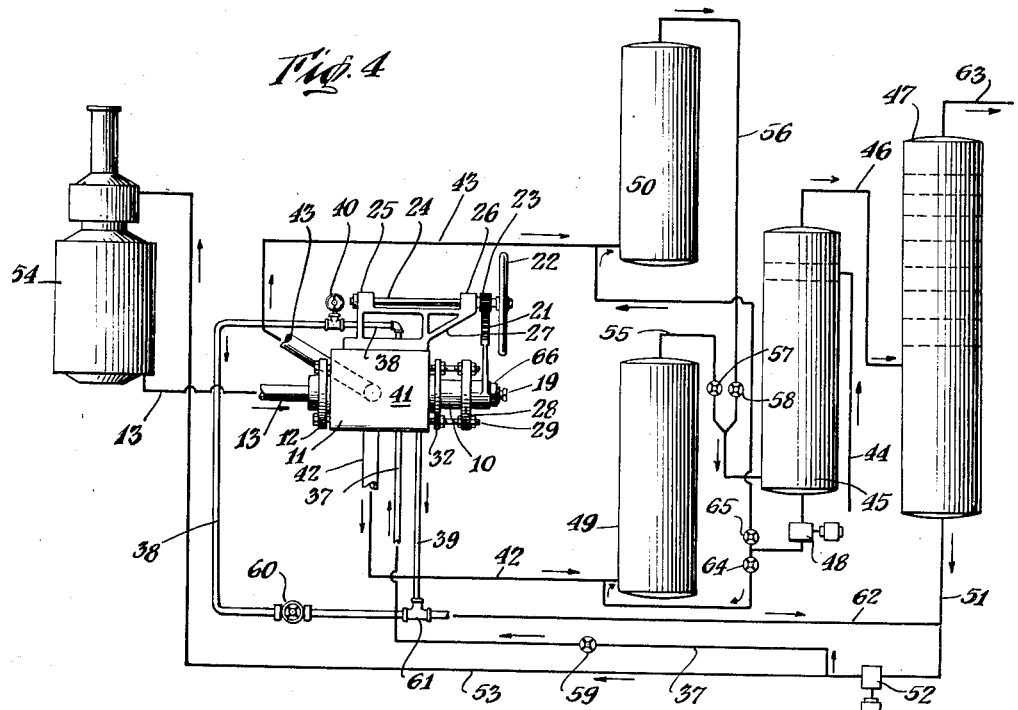
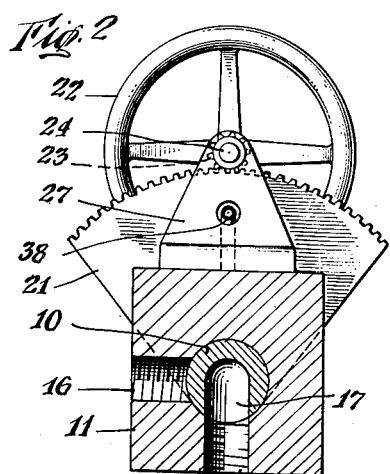
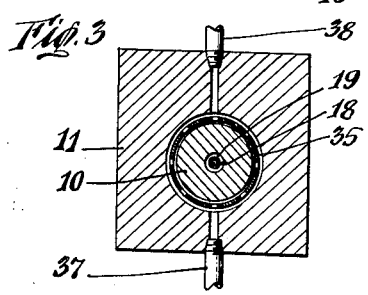
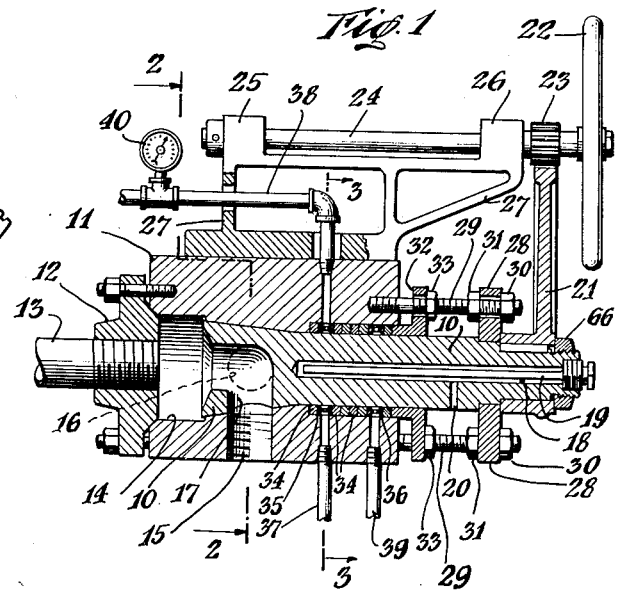
INVENTOR
*Luis De Florez*
BY
*Hoguet, Neary & Campbell*
ATTORNEYS Patented July 5, 1938

2,122,560

UNITED STATES PATENT OFFICE 2,122,560

FLUID VALVE

Luis de Florez, Pomfret, Conn.

Application March 21, 1936, Serial No. 70,086

2 Claims. (Cl. 251—93)

My invention relates to devices for occasioning directional changes in a flowing stream of fluid and, more particularly, to a valve device for changing the destination of fluid flow without interruption of the flow during the change. The valve is characterized by having a single inlet and a plurality of alternative outlets with means for transferring the fluid efflux from an originally selected outlet to any alternative outlet without other substantial modification of the fluid flow due to such transfer.

One of the features of my valve is the construction of the valve casing and plug in such a manner that the valve seats in the direction of flow of the influx fluid instead of in opposition to the flow of the fluid as is characteristic of the prior art devices. The flow of fluid through my valve, therefore, tends to seat rather than unseat the valve plug.

Another feature of my valve is the provision of means for controlling the flow of corrosive or sediment depositing fluids at high temperatures without the usual interference by such fluids with seating of the valve.

A further feature of my valve is the use of a cooling medium to prevent cracking and spalling of the packing material surrounding the valve plug, which packing usually becomes heated to high temperatures during the operation of the valve and which, in the absence of such cooling means, is susceptible to cracking and spalling.

A still further feature of my valve is its adaptation to an oil cracking system in which a portion of the refined oil passing through the system is utilized for effecting smooth and constant operation of the valve without interference by the high temperature crude oil which passes directly through the valve.

The novel features of my invention are set forth with particularity in the appended claims. The invention itself, however, both as to its organization and method of operation, will be fully understood by reference to the following description taken in conjunction with the accompanying drawing, in which:

Figure 1 is a side elevational view of a cross-section of my valve;

Figure 2 is an end view of a vertical section of the valve taken along lines 2—2 of Figure 1;

Figure 3 is an end view of a vertical section of the valve taken along line 3—3 of Figure 1; and Figure 4 is a diagrammatic representation of an oil cracking unit in which my valve is used for occasioning directional flow of the oil.

The same reference numerals have been used in the several figures to identify like parts of the device.

Referring now to Figure 1 shown in the drawing, the valve comprises a plug 10 which has a cylindrical portion of comparatively small diameter and a conical seating portion of comparatively large diameter, the conical portion being substantially shorter in length than the cylindrical portion. The plug 10 partially projects into one end of a valve casing 11 and is adapted to move therein. A flange 12 is provided at the inlet end of the casing 11 for attaching the valve device to a conduit 13. The inlet end of the casing next to the flange 12 has an enlarged opening indicated at 14 into which the conical end of the valve plug 10 partially projects, the diameter of the opening 14 being slightly larger than the largest diameter of the conical section of the plug 10. This opening 14 forms an inlet for the influx of vapors or liquid to the valve device.

The valve may be provided with any desired number of alternative outlets. In Figure 1, two such outlets are shown at 15 and 16. The invention, of course, is not to be limited in scope to any specific number of outlets.

The plug 10 has a bore at its inner end as indicated at 17 to provide for the directionally controlled passage of fluids through the valve device. In order to avoid undue turbulence resulting from the change of directional flow this bore is formed entirely of smooth curved surfaces which reduce the pressure drop through the device to a minimum. The plug 10 may, if desired, enter the casing 11 at an angle to the longitudinal axis thereof, instead of parallel to this axis as shown in Figure 1.

The cylindrical portion of the plug 10 is provided with a longitudinal bore 18 and a tubular conduit 19 for introducing a cooling fluid such as steam into the plug 10 during operation of the valve under high temperature conditions. An exhaust channel 20 is provided for the escape of the cooling medium introduced through conduit 19.

At the outer end of the plug 10 is mounted a self-contained turning mechanism which provides for movement of the plug 10 about its axis within the casing 11. This turning mechanism, some of the details of which are shown in Figure 2, comprises a gear quadrant 21 carried by the plug 10 and held in place by the nut 66. Movement of the gear quadrant 21 and turning of the plug 10 thereby is occasioned by means of the hand wheel 22 operating through the medium of the spur gear 23 and the shaft 24. The shaft 24 rotates in the bearings 25 and 26 which are supported by the superstructure 27, which is, in turn, supported by the valve casing 11. The arc of the gear quadrant 21 will, of course, be determined by the number and location of the casing outlets.

In order to facilitate turning of the plug 10 upon its axis at the time of effecting a directional change in the fluid flow when corrosive or coke-forming fluids heated to a high temperature are passing through the valve device, means are provided for projecting the plug 10 from its seat a slight amount prior to turning. Under some conditions the valve device is operated at or nearly at red heat and consequently it is desirable to unseat the plug before turning it to avoid wearing or breaking of the seating surfaces. The means shown in Figure 1 for effecting unseating of the plug 10 comprise a collar and stud and nut arrangement. The collar 28 is rotatably mounted around a recessed portion of the plug 10 as shown. Studs 29 extend through the collar 28 and are threaded into the valve casing 11. Nuts 30 and 31 are provided on the sides of the collar 28.

To effect longitudinal movement of the plug 10 toward the opening 14 and thereby unseat the plug, the nuts 31 are first backed away from the collar 28 and then the nuts 30 rotated to press against the collar and drive the plug 10 forward. This longitudinal movement of the plug effects a slight separation between the plug and casing along the conical seating portion thereby making possible a free easy rotation of the plug 10, through the intermediary of the gear quadrant 21 and wheel 22, as explained above, for changing the direction of outward flow of the fluid entering the opening 14.

When the plug 10 has thus been sufficiently rotated to cause the bore 17 to coincide with the chosen outlet, it may be moved longitudinally in the reverse direction, i. e., toward the nut 66, to effect a reseating of the plug along its conical seating section. Prior to such movement the nuts 30 are backed away from the collar 28, and the movement of the plug then effected by screwing the nuts 31 against the collar 28. As will be explained more in detail below this reseating of the plug 10 is not essential when the novel cooling and leak preventing means of this invention are employed.

The means above referred to for effecting smooth and constant operation of the valve without interference by the hot corrosive and coke-forming influx fluid, which means are also used for cooling the packing material, preventing leakage of the hot influx fluid back along the cylindrical portion of the plug and for lubricating this cylindrical portion during turning thereof, are shown in Figures 1 and 3 and their adaptation to an oil cracking unit is illustrated in Figure 4. Referring now more particularly to Figures 1 and 3, the valve plug 10 is surrounded along a portion of its cylindrical section by a compression ring 32, which is held by nuts 33. This ring 32 serves to compress packing material 34 located around the plug 10 and between it and the casing 11. Located between sections of this packing material 34 are lantern rings 35 and 36. To the lantern ring 35 are connected an inlet conduit 37 and an outlet conduit 38. To the lantern ring 36 is connected an outlet conduit 39.

The conduit 37 as explained more in detail hereinafter in connection with the description of Figure 4, introduces a cooling and lubricating medium, such as refined oil, onto and around the contact surfaces of the plug 10 and the valve casing 11. This cooling medium may have a temperature, for example, of 600–650° F. which although relatively high, is cool in comparison with the main body of liquid, the direction of flow of which is controlled by the valve.

The cooling medium entering through the conduit 37 is utilized in the following manner for providing improved operation of the valve device. This cooling medium, such as refined oil, spreads, by leakage, in both longitudinal directions from the lantern ring 35 along the contact surfaces of the plug 10 and casing 11. The portion of cooling oil which leaks back along the cylindrical section or stem of the plug 10 and finally leaves the valve by way of outlet conduit 39, serves principally the purpose of maintaining the packing 34 in a relatively cool condition thereby preventing it from cracking and spalling. Secondarily, this same portion of the cooling oil serves the purpose of lubricating the stem of the plug 10 thereby providing free and easy rotation of the latter when the valve is being changed to select another outlet as explained hereinabove.

The portion of the cooling oil which flows, by leakage, toward the inlet end of the plug 10 serves the purpose of repelling that part of the hot influx fluid which tends to flow, by leakage, from the inlet back along the conical seating portion and eventually to the cylindrical portion of the plug 10. If this hot coke-forming, and corrosive fluid is allowed to leak back along the path described it will cause corrosion of the metal surfaces, will deposit coky materials that cause sticking of the valve, and will heat the packing material 34 beyond its temperature endurance thereby causing the latter to crack and break off. All of these undesirable results are prevented, however, by means of the cooling oil that flows toward the inlet 14. This cooling oil is not corrosive, or coke-forming and is maintained under slightly higher pressure than the leakage portion of the hot influx fluid so that it prevents the latter from flowing back along the valve plug.

Some of the cooling oil introduced through the conduit 37 and lantern ring 35 flows continuously and practically directly around the stem of the plug 10 and thence through the ring 35 and outlet conduit 38. This portion of the oil serves principally the purpose of maintaining the stem and surrounding packing material 34 in a comparatively cool condition. A pressure gauge 40 is provided in conduit 38 for indicating the pressure of the cooling fluid flowing through the valve, which pressure is controlled by an arrangement of two valves as explained below in connection with Figure 4.

As suggested hereinbefore the cooling oil entering through the conduit 37 might also be used under sufficient pressure to permit the valve plug 10 to remain at all times in a slightly unseated position, that is, with a slight separation between the conical surfaces of the plug 10 and casing 11. This arrangement would facilitate operating the valve to effect a directional change in the flow of influx fluid, since the above described unseating and reseating operations of the valve plug would not be necessary. That is, the plug would be free to turn, at all times, without any longitudinal adjustments.

The adaptation of my valve to an oil cracking unit or system, and particularly the utilization of a portion of the refined oil in such a system for cooling and lubrication of the valve parts above is illustrated in Figure 4. Referring now more particularly to Figure 4, the valve illustrated diagrammatically at 41 is connected to the inlet conduit 13 and is provided with two alternative outlet conduits 42 and 43. The operation of this oil cracking unit and particularly the use of my valve therein is, in brief, as follows: Crude oil to be treated is introduced through the inlet 44 into the distilling chamber or evaporator 45 where, by direct contact with the vapors therein a substantial portion of the crude oil is vaporized and passes through conduit 46 into the fractionating column 47. The unvaporized residue in the evaporator 45 is pumped by means of pump 48 into one or the other of conduits 42 and 43 depending upon the manipulation of valves 64 and 65 and thence into one or the other of coking drums 49 and 50 depending upon which one is in use. These coking drums are used alternately, one of them being emptied and cleaned while the other one is in use, without interfering with the continuous operation of the unit as a whole.

The gasoline and other light distillates which are separated out from the heavier oil in the fractionating column 47 pass out through the outlet pipe 63. The unvaporized residue in the fractionating column 47 is conducted through line 51 and thence through the pump 52 which pumps this oil through conduit 53 into the tubular heater 54 in which the oil is heated to a high temperature. The heated oil is conducted through inlet conduit 13 into the valve 41. Depending upon the selection of the outlet port for this valve, the hot fluid passes either through the outlet conduit 42 into the coke drum 49 or alternatively through the outlet pipe 43 into the coke drum 50. The distilled portions of the oil in the drums 49 and 50 are passed through lines 55 and 56 respectively, and alternately through valves 57 and 58 into the distilling chamber 45, from whence the undistilled and distilled oil passes to the other parts of the system in the manner described above.

Referring again to the refined oil passing through line 51 and pump 52, it is to be noted that the inlet conduit 37 for the valve 41 is also connected to the pump 52. Now, by opening valve 59 clean oil from pump discharge line 53 is caused to flow through the inlet conduit 37 and through lantern ring 35 as described in connection with Figure 1. At the lantern ring 35, see Figure 1, a portion of this oil is diverted by leakage for the purposes above described, along the cylindrical portion of the plug 10 and out conduit 39 and also between the seating surfaces of plug 10 and valve casing 11 to opening 14 where it combines with the main stream of influx fluid. The oil not diverted as described flows out through conduit 38. Valve 60 is provided in conduit 38 for the purpose of adjusting the pressure of the cooling oil flowing through the valve 41 to the desired value. Closing valve 60 and opening valve 59 operates to increase this pressure and vice versa.

The outlet pipes 38 and 39 join at the point 61 and the oil flowing through this junction is fed back through line 62 into the line 51 and the above cycle repeated so as to maintain a continuous flow of cooling oil through the valve 41.

It will be understood, of course, that the principal volume of the oil flowing through the system shown in Figure 4 flows through the inlet 13 of the valve 41 and after passing through the valve it flows through one or the other of the two outlet conduits 42 and 43 into either the drum 49 or the drum 50 depending upon which one of the outlet ports of the valve has been selected. Only a small portion of the refined oil from the fractionating column 47 is utilized for cooling and for otherwise effecting efficient operation of the valve in the manner described above.

It is to be understood that my invention is not limited to the specific modifications described and illustrated herein but is susceptible to various changes that will occur to one skilled in the art. A number of the novel features of my invention are set forth in the appended claims.

I claim:

1. A valve adapted to effect directional changes in a flowing stream of hot oil at high temperature and pressure, comprising a valve casing, an inlet at one end thereof, a frusto-conical valve seat in said casing tapering from and communicating with said casing inlet, a frusto-conical valve plug in said seat adapted to turn therein and having the end of greater area directed toward said casing inlet whereby the hot oil normally tends to force the plug into said valve seat, said plug having a passage communicating at one end with said casing inlet and terminating at its other end in the frusto-conical wall of said plug, a plurality of spaced outlet passages circumferentially disposed around said valve seat for selective communication with the said other end of said valve plug passage, an elongated stem on the smaller end of the plug projecting outwardly through the casing, means cooperating with the stem and casing to maintain the plug in spaced relation to the seat, packing in said casing surrounding said stem, means for delivering a relatively cool liquid to said stem and packing at a pressure in excess of the pressure of the hot oil in said casing inlet, and means for directing the cool liquid between the plug and its seat to form a film of liquid flowing into the hot oil, whereby flow of hot oil between the plug and seat is prevented.

2. A valve adapted to effect directional changes in a flowing stream of hot oil at high temperature and pressure, comprising a valve casing, an inlet at one end thereof, a frusto-conical valve seat in said casing tapering from and communicating with said casing inlet, a frusto-conical valve plug in said seat adapted to turn therein and having the end of greater area directed toward said casing inlet whereby the hot oil normally tends to force the plug into said valve seat, said plug having a passage communicating at one end with said casing inlet and terminating at its other end in the frusto-conical wall of said plug, a plurality of spaced outlet passages circumferentially disposed around said valve seat for selective communication with the said other end of said valve plug passage, means cooperating with the plug and casing to maintain the plug in spaced relation to the seat, means for delivering a relatively cool liquid between said plug and its seat, and means for maintaining a pressure on said cool liquid in excess of the pressure of the hot oil in said inlet, whereby the cool liquid repels the flow of hot oil between said plug and its seat.

LUIS DE FLOREZ.